United States Patent [19]
Massa

[11] 3,842,398
[45] Oct. 15, 1974

[54] APPARATUS AND METHOD FOR DEPLOYMENT OF EXPENDABLE VELOCIMETER TO ELIMINATE DOPPLER SHIFT ERROR IN THE MEASUREMENTS

[75] Inventor: Donald P. Massa, Cohasset, Mass.

[73] Assignee: Massa Division, Dynamics Corporation of America, Hingham, Mass.

[22] Filed: May 8, 1972

[21] Appl. No.: 251,383

[52] U.S. Cl.................. 340/5 S, 73/170 A, 340/3 T
[51] Int. Cl. ........................................... H04b 11/00
[58] Field of Search............ 340/5 S, 3 D, 3 E, 3 T; 181/0.5 AP; 73/170 A

[56] References Cited
UNITED STATES PATENTS
3,341,808  9/1967  Levin et al............................ 340/5 S Primary Examiner—Richard A. Farley
Attorney, Agent, or Firm—Louis Bernat

[57] ABSTRACT

A correction is applied to a sound velocity vs. depth profile in order to eliminate a Doppler shift caused by the relative speed between a transmitter on a velocimeter dropping through the ocean and a receiver on a hydrophone moving parallel to the surface of the ocean. The Doppler shift error is controlled by a selection of the meter launch conditions so that the correction factor is predictable. Preferably, the hydrophone carries the velocimeter until the instant of launch so that the meter falls straight down from the hydrophone. Similar techniques may be used to correct the Doppler shift errors when the velocimeter is dropped from an aircraft and the hydrophone pickup is stationary on the surface of the ocean.

8 Claims, 5 Drawing Figures

PATENTED OCT 15 1974

3,842,398

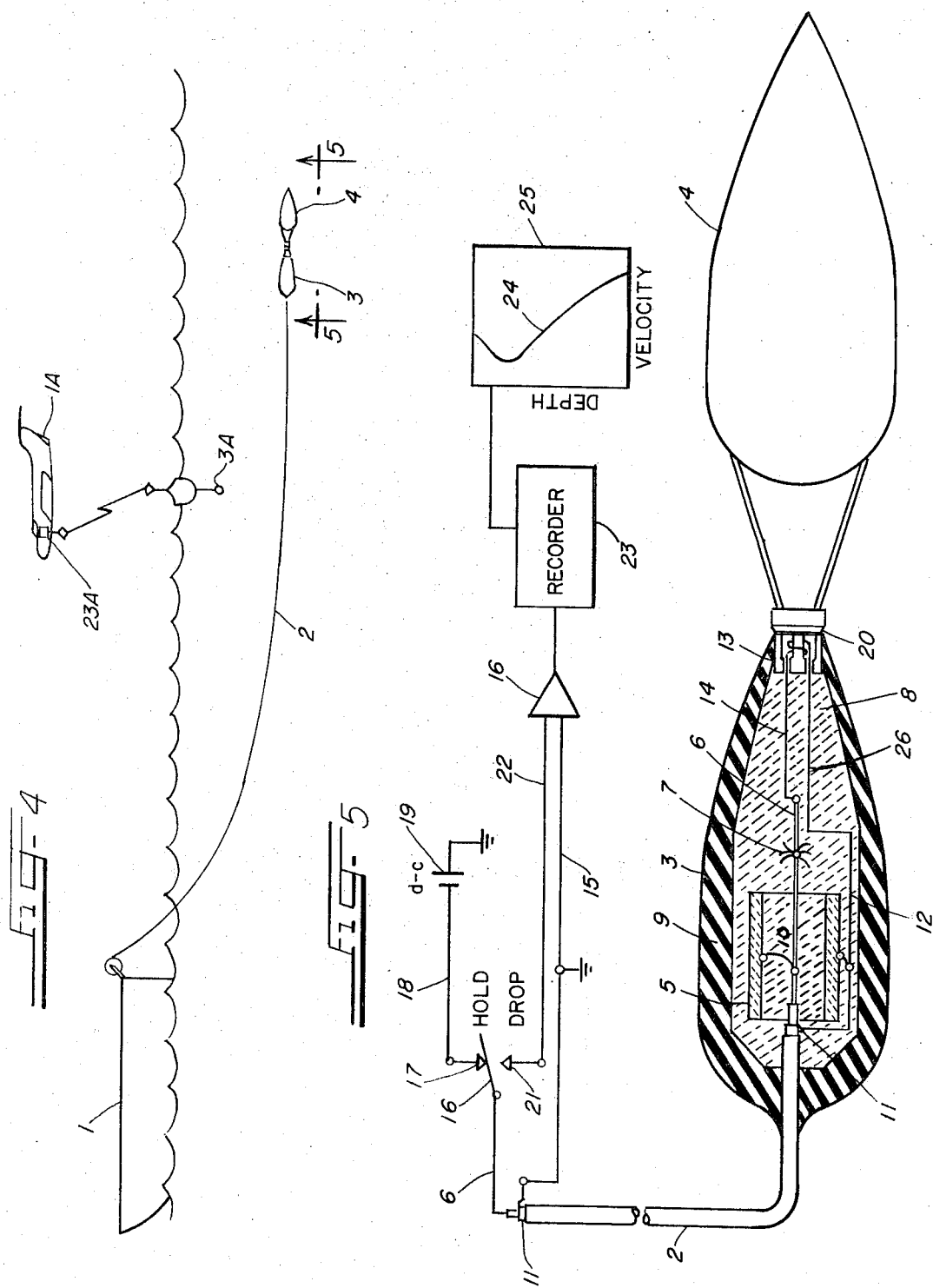

APPARATUS AND METHOD FOR DEPLOYMENT OF EXPENDABLE VELOCIMETER TO ELIMINATE DOPPLER SHIFT ERROR IN THE MEASUREMENTS

This invention relates to velocimeters and more particularly to expendable free falling velocimeters for directly measuring the velocity of sound vs. depth in a body of water such as the ocean.

Velocimeters of the type with which this invention is concerned are shown in co-pending U.S. Pat. application Ser. No. 30,631, filed Apr. 22, 1970 by Frank Massa and Donald P. Massa and assigned to the assignee of this invention. Another type of velocimeter is illustrated in U.S. Pat. No. 3,611,276 wherein several methods are shown for obtaining the velocity of sound measurement through use of a receiving hydrophone, either suspended or towed near the surface of the water. This hydrophone is adapted to pick up acoustic signals being radiated from the falling velocimeter probe. The frequency of the acoustic signal radiated from the free falling probe represents the instantaneous velocity of sound at the particular depth through which the probe is falling. Although the frequency radiated from the probe represents the velocity of sound in the medium, the frequency received by the hydrophone is modified by the Doppler shift resulting from the relative motion between the transmitting probe and the receiving hydrophone.

This invention is also concerned with an analysis of the variation in the Doppler shift error under different launching conditions. Also, analysis is made under the varying positions at which the hydrophone is placed relative to the position of the velocimeter at the time of launch. The invention is also concerned with improved means for launching an expendable velocimeter whereby the Doppler shift error is made negligible, or alternatively, whereby the Doppler shift remains constant during the falling period of the velocimeter, so that an appropriately fixed error correction may be applied to the data.

A primary object of this invention is to improve the method of launching a free falling velocimeter probe whereby the Doppler shift error is controlled and whereby the recorded sound velocity vs. depth profile data is made, free of significant error in the measurement.

Another object of this invention is to provide a means for launching a free falling velocimeter probe from a moving vessel whereby the Doppler shift error will be fixed and be a function of only the ship's speed. Therefore, a fixed correction can be easily applied to picked recorded data obtained from the acoustic signal picket up by the towed receiving hydrophone.

A still further object of this invention is to provide a method of launching velocimeter probes from aircraft so that the sound velocity vs. depth profile information, which is picked up as a received acoustic signal by a sonobuoy mounted hydrophone, is free of significant Doppler shift error.

In keeping with an aspect of the invention, these and other objects are accomplished by means for receiving acoustic signals which are being continuously transmitted from a free falling velocimeter probe, having a drop velocity determined by its shape and weight. The frequency of the acoustic signal generated by the probe is directly proportional to the velocity of sound in the water at the position of the probe, as it falls through the water. A receiving hydrophone, which may be towed by a surface ship or be suspended from a helicopter or from a sonobuoy, picks up the acoustic signal transmitted from the falling velocimeter probe. The measured frequency of the signal is directly related to the velocity of sound in the water at the position of the probe during its drop. Due to the Doppler shift caused by the relative motion between the falling probe and the receiving hydrophone, the frequency of the received signal will not be equal to the frequency of the acoustic signal generated by the probe. This difference in frequency will introduce an error in the measured data. In accordance with the teachings of this invention, the magnitude of the Doppler shift error is controlled such that, in some circumstances, it is made negligible in affecting the accuracy of the measurements. In other instances, it is controlled such that the error is held constant throughout the period of drop so that a fixed numerical correction is applied to the received frequency, thereby achieving high accuracy for the recorded sound velocity vs. depth data.

The Doppler shift error is a complex function of the horizontal distance from the hydrophone, at which the velocimeter probe is launched, and of the speed at which the receiving hydrophone is towed. An analysis of the Doppler shift error, as a function of the variables in the system, will give an understanding of the magnitude of the Doppler shift error.

The invention may be better understood from a study of the following description when taken in connection with the accompanying drawings in which:

FIG. 4 is a sketch illustrating a ship which is towing a submerged hydrophone together with a velocimeter which is being held in close proximity to the hydrophone; and FIG. 5 is an enlarged view taken in the direction 5—5 of FIG. 4 which shows the towed hydrophone in cross section and also shows the schematic electrical connections from the hydrophone to the recording system.

When a velocimeter probe is falling through the water and transmitting an acoustic signal whose frequency is directly proportional to the velocity of sound at the position of the probe, a receiving hydrophone which is moving horizontally with respect to the vertical axis of the falling probe will pick up the acoustic signal with a frequency that is different than the frequency transmitted from the probe, because of the Doppler shift. The magnitude of the difference in frequency will depend on the relative change in the separation distance between the hydrophone and the velocimeter. Assuming that the hydrophone is being towed by a ship moving at a constant speed there will be three possible conditions for making the velocimeter launch. The velocimeter may be launched either at a point which is ahead of the towed hydrophone, or at a point which is behind the towed hydrophone, or the launch may be made at a point in the immediate proximity to the towed hydrophone.

If the velocimeter is launched at a point which is ahead of the trailing hydrophone, the hydrophone will be initially moving toward the vertical axis along which the velocimeter is dropping during the early period of the drop and later, after passing over the vertical axis of the drop, the towed hydrophone will be moving away from the vertical axis. This means that the Doppler shift error will vary considerably during the early initial period of the drop.

If the velocimeter is launched at a point behind the towed hydrophone, the hydrophone will be always moving away from the vertical axis of the drop which will tend to reduce the magnitude of the initial variation in the Doppler error as compared to a launch made at a point ahead of the towed hydrophone. However, in either case there will be a variable Doppler shift in frequency which will change rapidly during the initial period of the drop and eventually approach a constant shift in frequency during the later period of the drop.

If the launch is made at a point coincident with the hydrophone position, the Doppler shift will be a constant throughout the entire period of the drop, as will be shown later. The magnitude of the Doppler shift will be a function of the ship's speed and the velocity of the falling velocimeter.

Figure 1:
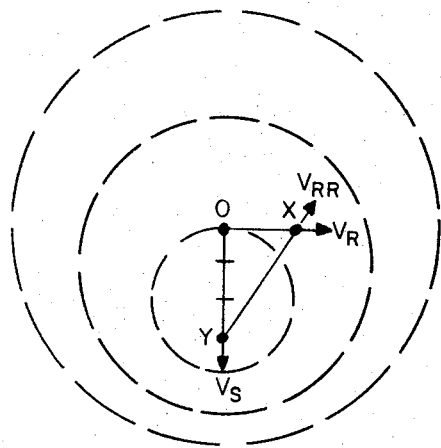
FIG. 1 is a schematic representation of the instantaneous positions of a velocimeter Y dropping vertically from the launch position O, and a hydrophone X moving horizontally from the same point of origin O.

The schematic representation for this condition of coincident launch position is shown in FIG. 1 in which the velocimeter Y is launched from the position O at the same instant of time that the receiving hydrophone X was also at position O. The position of successive wave fronts due to the sound radiated from the velocimeter during the period of the drop are shown by the dotted circles. The outer circle represents the position of the wave front of the sound which originated from the velocimeter when it began its drop from the position O. At the time of launch ($t=0$), the hydrophone was at position O and moving in the direction O–X at the ship's speed $V_R$. At the same time, the velocimeter Y starts its vertical descent from the same position O in the direction O–Y at a constant drop velocity $V_S$.

Figure 2:
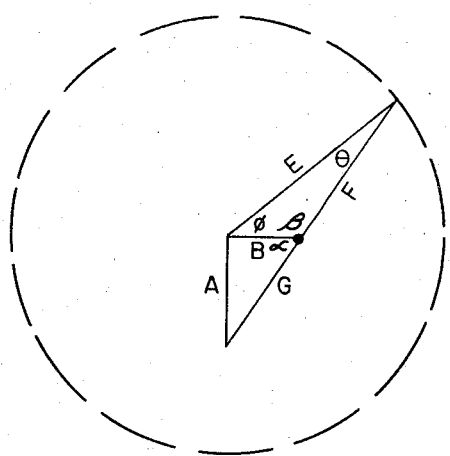
FIG. 2 is a vector diagram, derived from the situation illustrated in FIG. 1, which will be used to illustrate the computations for deriving the Doppler shift error.

The large diameter outer circle in FIG. 1 has a center at O and represents the position of the wave front of the initial sound signal transmitted by the velocimeter at the start of its drop from position O. The smaller circles represent positions of the wave fronts transmitted by the velocimeter from different points along its descent which correspond to the centers of the different circles. The vector diagram in FIG. 2 illustrates the mathematical relationships that will be derived for the conditions illustrated in FIG. 1. The dotted circle in FIG. 2 represents the same wave front that is represented by the outer circle in FIG. 1. Referring now to the FIGS. 1 and 2, the following relationships may be written:

$$A = V_s t \quad (1)$$

$$B = V_R t \quad (2)$$

$$E = ct \quad (3)$$

where:
$V_S$ = velocity of dropping velocimeter
$V_R$ = speed of ship and hydrophone
$t$ = time elapsed from launch
$c$ = velocity of sound in the medium.

The apparent wave length of the sound signal picked up by the receiving hydrophone will be proportional to the wave length which the receiving hydrophone experiences in cutting through the successive wave fronts along the direction Y–X in FIG. 1. The apparent wave length along the direction Y–X is given by:

$$\lambda = G + F/f_s t \quad (4)$$

where:
A, B, E, F, and G are the vectors shown and identified in FIG. 2
$f_S$ = the frequency of the sound signal being transmitted by the velocimeter.

The vector $V_{RR}$ in FIG. 1 represents the relative velocity of the ship along the direction of the line Y–X. If $f_R$ is the received frequency then:

$$f_R = \text{relative speed of the wave}/\lambda = c - V_{RR}/\lambda \quad (5)$$

From the geometry of the vector diagram in FIG. 2 and from the relationships shown in Equations (1), (2) and (3) it can be shown that:

$$G = \sqrt{A^2 + B^2} = t\sqrt{V_S^2 + V_R^2} \quad (6)$$

$$\alpha = \tan^{-1}(A/B) = \tan^{-1}(V_S/V_R) \quad (7)$$

$$\beta = \pi - \alpha \quad (8)$$

$$\sin \theta = (B \sin \beta)/E \quad (9)$$

$$\theta = \pi - \beta - \theta \quad (10)$$

$$\sin \theta = \sin \cos \theta + \cos \sin \theta \quad (11)$$

$$F = (E \sin \phi)/\sin \beta = (ct \sin \phi)/\sin \beta \quad (12)$$

$$V_{RR} = V_R \cos \quad (13)$$

Substituting into Equations (3) and (4).

$$\lambda = \frac{t\sqrt{V_S^2 + V_R^2} + (ct \sin \phi)/\sin \beta}{f_S t} \quad (14)$$

$$f_R = \frac{c - V_R \cos^\alpha}{\sqrt{V_S^2 + V_R^2} + (c \sin \phi)/\sin \beta} f_S \quad (15)$$

Equation 15 indicates that when the velocimeter is launched at a point in close proximity to the receiving hydrophone, the Doppler shift in the received frequency is only a function of $c$, $V_R$ and $V_S$. Therefore, the shift is independent of time and remains constant throughout the entire period of the drop. For the special case in which the receiving hydrophone is stationary (ship speed = 0) and only the velocimeter is moving, Equation 15 reduces to:

$$f_R = (c/V_S + c)f_S \quad (16)$$

which is the classical Doppler shift equation for the situation occurring when the receiver and transmitter are moving away from each other along a fixed axis in space.

Figure 3:
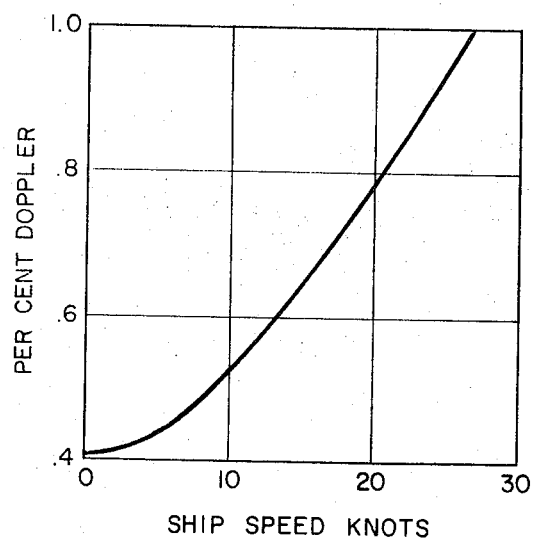
FIG. 3 is a graph showing the magnitude of the Doppler shift error for the launch condition depicted in FIG. 1 as a function of the ship's speed.

The Doppler shift data computed from Equation 15 for various ship speeds and a velocimeter drop velocity $V_S = 20$ ft/sec (which is a typical value for a practical design) are plotted on the graph in FIG. 3. The fixed Doppler shift error at any ship speed may be read from the graph and can be added to the received frequency in order to obtain the true frequency being transmitted from the velocimeter. If the velocimeter drop velocity is different from the assumed 20ft/sec, it is obvious that a curve different from that shown in FIG. 3 would be computed from Equation 15. The new corresponding Doppler shift error would apply to the recorded data.

For a condition of launch wherein the velocimeter is dropped either ahead or behind the position of the towed hydrophone, the Doppler error will not remain constant during the early period of the drop because the angle $\alpha$ in FIG. 2 will be varying rapidly during this initial period.

Following an analysis similar to that employed in deriving the equations for the condition of launch, illustrated by the diagrams in FIGS. 1 and 2, the variation in the Doppler shift error was computed as a function of the distance ahead or behind the towed hydrophone at which the velocimeter was launched. As was to be expected, the magnitude of the initial variation in the Doppler shift error becomes greater as the distance of launch from the hydrophone position becomes greater. Assuming that it is desired to hold the variation in Doppler shift error at less than 0.067 percent (this corresponds to an error of less than 1m/sec in the measured velocity of sound for velocimeter depths greater than 10 meters), it is required that the launching distance be no greater than approximately 30 feet behind the towed hydrophone nor more than a distance of approximately 20 feet ahead of the towed receiving hydrophone. It follows, therefore, that the variation in Doppler shift error during the early period of the drop is greater when the velocimeter is launched ahead of the position of the towed hydrophone as compared to a launch at the same distance behind the hydrophone.

Another analysis of the Doppler shift equations derived above was made to determine the error that would result when velocimeter drops were made at different distances from a fixed hydrophone such as, for example, a sonobuoy suspended hydrophone dropped by a sonar patrolling aircraft. Again, assuming that a maximum permissible error in the measurement of the velocity profile is held to 0.067 percent over an entire range of depth down to 1,000 feet, it is found that the distance at which the velocimeter drop is to be made must be greater than approximately 1 mile from the position of the fixed hydrophone. For distances which are less than 1 mile, the Doppler shift error will increase, and the correction to the received frequency data would require an exact knowledge of the launch distance from the hydrophone, which would be difficult to establish for air launched velocity profile surveys. Therefore, for such air launched surveys, if all launch distances are made approximately 1 mile or more from the fixed receiving hydrophone position, the absolute error in measurements will always be less than 1m/sec, and no correction is required for the recorded data.

FIG. 4 illustrates a ship 1 towing an electrical cable 2 to which is attached a receiving hydrophone 3. A velocimeter 4 is held in contact with the hydrophone 3, and they are being towed together by the moving ship. An airplane 1A carries a recorder 23A for making a velocity vs. depth profile responsive to signals transmitted from a moored hydrophone 3A.

A larger more detailed view of the towed hydrophone and velocimeter is shown in FIG. 5 in which the hydrophone 3 is shown in cross section to illustrate some of the elements in the invention. The hydrophone 3 includes, as the active transducer element, a conventional polarized tubular ceramic cylinder 5 with conventional electrodes such as fired silver applied to the inside and outside wall surfaces as is well known in the art. The tow cable 2 includes a stranded coaxial conductor 6, which for example, may be beryllium copper or copper clad steel with adequate strength to withstand the towing forces. Some of the strands 7 from the center conductor 6 are arranged as illustrated to form an anchor in the rigid potting compound 8 which is used to consolidate the assembly before applying the rubber covering 9 to complete the waterproof assembly of the hydrophone and cable. Before adding the potting compound 8, the inner electrode of the ceramic cylinder is electrically connected to the cable conductor 6 by a soldered lead 10 as shown. The shield 11 of the coaxial cable is connected by conductor 12 to the outer electrode of the ceramic cylinder and also to the terminal conductor 26 of the electromagnet 13. The other terminal conductor 14 from the electromagnet is soldered to the coaxial conductor 6 as illustrated. It is preferable to make the electrical impedance of the electromagnet higher than the impedance of the ceramic element 5 at the frequency of operation of the velocimeter.

After making all the electrical connections, the various components of the structure are held together by the rigid potting compound 8 which may be an epoxy having sound transmission characteristics similar to that of water. To complete the assembly a waterproof rubber or rubber-like coating 9 is molded over the potting compound 8 and forms a blended streamlined attachment to the outer rubber jacket of the cable 2 as illustrated. The shipboard end of the cable 2 has its shield connected by conductor 15 to one input terminal of the amplifier 16 as shown in the schematic wiring diagram. The center conductor 6 is connected to a two-position switch 16 which is shown in the position HOLD in FIG. 5. The switch terminal 17 is connected by conductor 18 to a source of dc power represented by the battery 19. With the switch in position HOLD as illustrated in the schematic diagram, the coaxial cable is transmitting a dc signal to the electromagnet 13 which causes the magnetic face 20 of the velocimeter 4 to be attracted securely to the hydrophone 3. Details of the velocimeter 4 are not shown because they do not form part of this invention. Details of velocimeters of the type that can be used in this invention, to convert velocity of sound to a variable frequency acoustic signal, are described in U.S. Pat. No. 3,611,276 and also in co-pending U.S. Pat. application Ser. No. 30,631, filed Apr. 22, 1970.

When it is desired to obtain a depth vs. velocity profile with the towed system above described, the switch 16 is transferred from position HOLD to position DROP. At that instant, the dc supply is disconnected from the electromagnet 13, and the velocimeter is released. At the same instant the cable conductor 6 is connected to the switch terminal 21 and, by means of the conductor 22, to the input of the amplifier 16 as illustrated. Also at the instant of transferring the switch to the position DROP, the recorder mechanism 23 is started by means of an additional switch coupled to the switch 16 but not shown in the drawing. This recorder includes means for recording the magnitude of an electrical signal along one axis and a transport mechanism for moving a strip chart with a constant speed perpendicularly to said axis. A trace 24 is thereby recorded on the chart 25 to represent the sound velocity vs. depth profile through the water, as the velocimeter 4 is falling. The varying velocity of sound in the water, as the velocimeter descends, is converted to a variable frequency acoustic signal which is transmitted from the velocimeter. The radiated acoustic signal is picked up by the hydrophone 3. The varying frequency, which represents sound velocity, appears as a trace 24 which is plotted on a chart 25 by the recorder 23. The details of the amplifier and the recorder are known in the art.

The mechanism which has been described achieves the desirable objective of launching the velocimeter in the immediate vicinity of the towed hydrophone which results in a known Doppler shift in the measurements throughout the drop. The frequency error, as taken from a graph similar to FIG. 3, may then be automatically added to the received frequency before plotting the curve 24; or, the correction may be applied after the recording is made of the frequencies as received.

An advantage of the towed system is that the hydrophone is kept away from the ship's propeller, and a better signal-to-noise ratio is realized in the measurements which, in turn, means that the velocimeter drops may be extended to greater depths with less interference from the ship's noise.

While there has been shown and described, several specific illustrative embodiments of the present invention, it will, of course, be understood that various modifications and alternative constructions may be made without departing from the true spirit and scope of the invention. Therefore, the appended claims are intended to cover all equivalents falling within the true spirit and scope of the invention.

I claim:

1. In a system for directly measuring the sound velocity vs. depth profile along a vertical axis in a body of water, velocimeter means responsive to the velocity of sound in the immediate vicinity of said velocimeter for generating an acoustic signal in said water, said signal having a frequency which is proportional to said velocity of sound, signal pickup means including a length of electrical cable towing a hydrophone for converting said acoustic signal into an electrical signal, means for releasably securing said velocimeter in close proximity to said hydrophone during said tow, and means responsive to a command signal for releasing said securing means to drop said velocimeter from the point where said hydrophone is located at the instant of drop.

2. The invention in claim 1 and an amplifier, strip chart recorder means connected to the output of said amplifier for recording the magnitudes of said electrical signal along one coordinate axis on a chart, transport means for moving said chart with constant linear speed perpendicular to said coordinate axis, means for connecting said hydrophone signal to feed said signals to the input of said amplifier, means associated with said amplifier for converting the electrical signal received from said hydrophone into an electrical signal of varying magnitude for driving said recorder means.

3. The invention in claim 1 wherein said means for releasably securing said velocimeter to said hydrophone includes electromagnetic means associated with said hydrophone and a magnetic conducting means associated with said velocimeter whereby said velocimeter is held securely attached to said hydrophone when said magnetic conducting means is in contact with said electromagnet and when said electromagnet is energized, electrical power source means for energizing said electromagnet, and switching means for controlling the connection of said source of electrical power to said electromagnet.

4. The invention in claim 3 and strip chart recorder means actuated simultaneously with said switching means for starting said recorder when said source of electromagnet power is disconnected from said electromagnet.

5. A system for directly measuring the sound velocity vs. depth profile along an axis in a body of water comprising velocimeter means for generating a signal having a frequency which varies as a function of the velocity of sound in the water in the immediate vicinity of the velocimeter, a hydrophone for picking up said signal, an electrical cable connected to said hydrophone, electromagnetic means for attaching said velocimeter to said hydrophone responsive to an energizing of said electromagnet, means for supplying energizing power to said electromagnet responsive to an operation of a switching means, recorder means for making a continuously variable recording of the generated signals as received by the hydrophone, and means for starting said recorder synchronized with operation of said switching means to deenergize said electromagnet means whereby said recorder is started when the energizing power is removed from said electromagnet.

6. The invention in claim 5 wherein said electrical cable comprises common cable conductor means for connecting to said power supply means and for connecting the hydrophone to said recorder means, and common selective switching means for alternately connecting said common cable conductor to either said electromagnet power supply means or said recorder.

7. A system for aerial survey of the sound velocity vs. depth profiles of a body of water comprising an expendable velocimeter means launched from said aircraft, said velocimeter being streamlined for an efficient free fall through the water and having means for generating an acoustic signal having a frequency which varies in accordance with the variation of the velocity of sound in the immediate vicinity of the velocimeter during its fall, hydrophone means suspended in said body of water for receiving said acoustic signals and for transmitting a corresponding signal to said aircraft, the distance between the hydrophone position and the launching point of said expendable velocimeter being greater than approximately one mile.

8. The invention in claim 7 and recorder means in an aircraft making the launch for recording the received hydrophone signals as a function of time.

* * * * *